(No Model.)

D. W. SEELEY & A. BUCKMAN.
BALING PRESS.

No. 292,593. Patented Jan. 29, 1884.

Witnesses.
C. J. Mattison
J. F. Harris

Inventors.
D. W. Seeley
A. Buckman, by William H. Low,
Attorney.

UNITED STATES PATENT OFFICE.

DAVID W. SEELEY, OF ALBANY, AND ALEXANDER BUCKMAN, OF SCHODACK, NEW YORK; SAID BUCKMAN ASSIGNOR TO SAID SEELEY.

BALING-PRESS.

SPECIFICATION forming part of Letters Patent No. 292,593, dated January 29, 1884.

Application filed October 29, 1881. (No model.)

*To all whom it may concern:*

Be it known that we, DAVID W. SEELEY, of the city and county of Albany, and State of New York, and ALEXANDER BUCKMAN, of Schodack, in the county of Rensselaer and State of New York, have invented certain new and useful Improvements in Baling-Presses, of which the following is a specification.

Our invention relates particularly to the class of horizontal baling-presses wherein the loose material is fed into the forward end of the pressing-chamber to be compressed by means of a reciprocating plunger, and the finished bale is ejected at the rear end of the press; and the kind of press upon which our present invention is an improvement will be found clearly shown and described in Letters Patent of the United States No. 230,736, granted to us on the 3d day of August, 1880; and the objects of our improvements are, first, to provide means for effecting the compression of the material into a compact mass before it passes into the baling-chamber wherein the bale is tied-off and finished; second, to afford facilities for adjusting the sides of the pressing-chamber to produce any required degree of compression of the material in the bale before it passes from the pressing-chamber into the baling-chamber of the press; third, to afford facilities for effecting the operation of tying-off the bales by means of an open-sided baling-chamber provided with guiding-strips for guiding the bales sidewise in their passage through said chamber; and, fourth, to provide suitable means for adjusting the guiding-strips of the baling-chamber when required to produce a resistance to the passage of the bale through the baling-chamber.

The objects above set forth we attain by means of the mechanism illustrated in the accompanying drawings, which form part of this specification, and in which—

Figure 1:
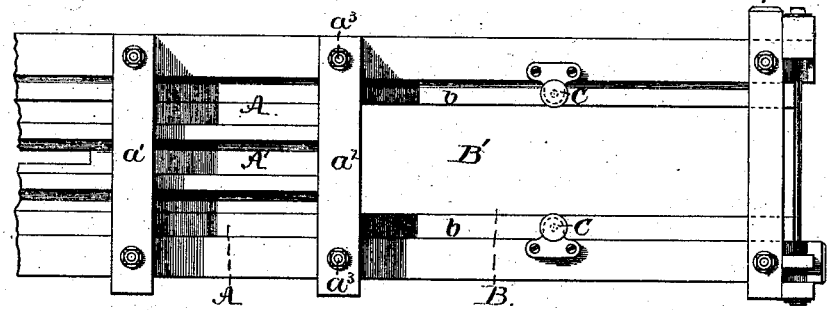
Figure 2:
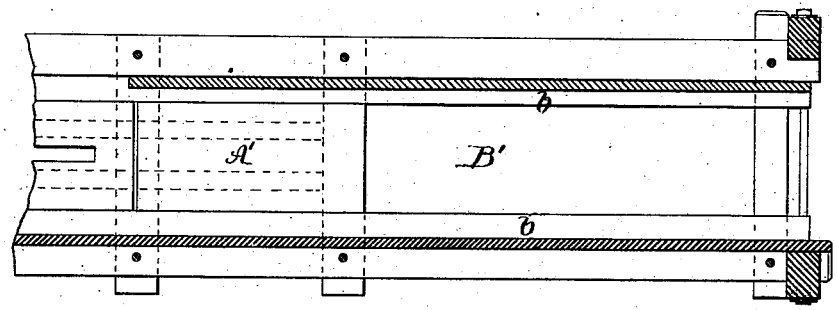
Figure 3:
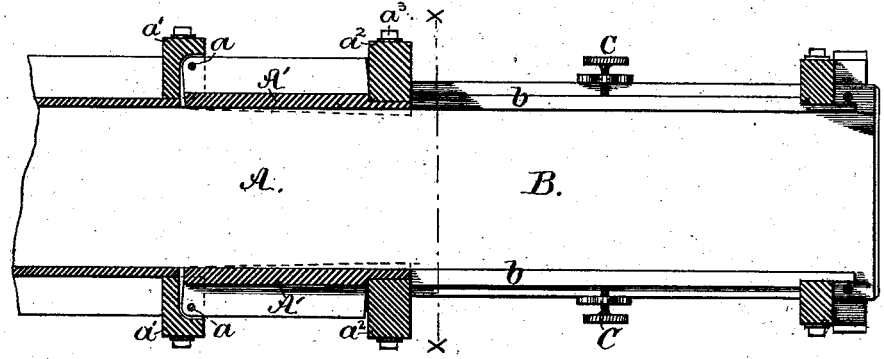
Figure 4:
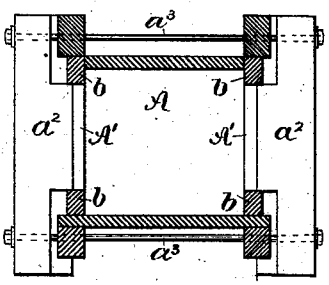

Figure 1 is a side elevation of that portion of a horizontal press affected by our invention; Fig. 2, a longitudinal section of the same; Fig. 3, a horizontal section, and Fig. 4 a transverse section at the line $x$ $x$.

We have found by experimenting that hay, straw, and other similar substances, after being condensed in the pressing-chamber and then released from said chamber, do not exert any force to expand the pack in a crosswise direction, and that the only resilient force possessed by such compressed material tends to elongate the pack in the direction in which the compressing force has been applied. From this fact we find that there is no necessity for extending the pressing-chamber to the rearmost end of the press in the mode of construction commonly practiced, and that by means of a short pressing-chamber—about the length of a finished bale, or less—the machine will perform its work in a more satisfactory and expeditious manner than when furnished with the usual form of long pressing-chamber.

As represented in the accompanying drawings, A is the pressing-chamber of our press, and B the open-sided baling-chamber, provided with guiding-strips $b$ at the top and bottom of both of the open sides of said chamber. The pressing-chamber A is provided with adjustable side pieces, A', that are attached, as at $a$, to the stationary vertical girt-pieces $a'$ of the press-frame, and the rear ends of said side pieces, A', are fastened to the movable vertical girt-pieces $a^2$, which are made laterally adjustable by means of the transverse tie-bolts $a^3$, in such manner that the sides at the rear end of the pressing-chamber can be forced inward, as indicated by dotted lines in Fig. 3, to contract the discharge-opening of said chamber, and the degree of such contraction may be varied as occasion requires to produce a greater or lesser resistance to the passage of a compressed bale, and thereby the density of the pack will accordingly be increased or diminished. While the adjusting mechanism is only shown in the drawings as applied to the sides of the pressing-chamber, it is obvious that the same or an equivalent adjustment may be applied with like effect to the top and bottom pieces of said chamber, or either of said pieces, and to either separately or in conjunction with the adjustable side pieces. The baling-chamber B is included in the framing of the press, and is provided with a close top and bottom; but the sides of said chamber are only provided with guiding-strips $b$, fixed at the upper and lower angles thereof, for guiding the bale in its passage through the said chamber. An opening, B', is formed at each side of the baling-chamber, so as to leave a clear open space between the upper and lower guiding-strips b, and extending the entire length of said chamber, and by means of said openings the operation of tying-off the bales—while retained in the baling-chamber—is greatly facilitated.

The guiding-strips b may either be secured in fixed positions at the places hereinbefore set forth, or, when preferred, the said strips, placed in the same locations, may be fastened at both of their extremities, while the intermediate portions are left free, and when arranged as last described, adjusting-screws C are fitted to bear against said strips at or near the middle of each opening B', for the purpose of bending each strip inwardly to contract the horizontal space between the opposite strips, so as to produce, when required, a second point of resistance to the movement of the bale while passing through the press.

We claim as our invention—

1. In a baling-press, the pressing-chamber A, provided with adjustable walls A', hinged, as at a, at their forward ends to a contiguous stationary part of the press, and arranged in relation to the baling-chamber B as herein described, for the purpose of completing the compression of the material before the bale is passed into the baling-chamber, as herein specified.

2. In a baling-press, the baling-chamber B, provided at two of its oppositely-located vertical sides with a single opening, B', and guiding-strips b, for the purpose of facilitating the operation of tying-off the bale before it is ejected from the press, as herein specified.

3. In a baling-press, the combination, with the pressing-chamber A, of the baling-chamber B, arranged in relation to the pressing-chamber as herein described, and provided at each of its vertical sides with a single opening, B', and top and bottom guiding-strips, b, as and for the purpose herein specified.

4. In a baling-press, the combination, with the baling-chamber B, provided with a single opening, B', in two of its oppositely-located vertical sides, of the guiding-strips b, secured at both ends, and adjusting-screws C, adapted to press against the middle portions of the said strips b, all constructed and arranged to operate as herein specified.

DAVID W. SEELEY.
ALEXANDER BUCKMAN.

Witnesses:
  WM. H. LOW,
  CHAS. F. SCATTERGOOD.